United States Patent
Frank

[11] 3,896,882
[45] July 29, 1975

[54] IMPLEMENT FRAME
[75] Inventor: William Rudolph Frank, Moline, Ill.
[73] Assignee: Deere & Company, Moline, Ill.
[22] Filed: June 1, 1971
[21] Appl. No.: 148,555

[52] U.S. Cl. ............... 172/311; 172/573; 280/412
[51] Int. Cl. .................... A01b 49/00; B62d 53/00
[58] Field of Search ........................... 172/311–314, 172/456, 587, 245–247, 573, 310; 280/411 R, 412, 413, 415, 456, 458, 459, 467, 472–473, 486–488, 489; 296/23 C, 26, 27

[56] References Cited
UNITED STATES PATENTS

| | | | |
|---|---|---|---|
| 1,319,626 | 10/1919 | Sedig | 280/472 |
| 1,610,180 | 12/1926 | Thomson | 280/486 |
| 2,230,567 | 2/1941 | Henderson | 280/458 |
| 2,726,097 | 12/1955 | Darrough | 280/458 |
| 3,064,996 | 11/1962 | Roppel | 172/311 |
| 3,213,946 | 10/1965 | Carrick | 172/587 |
| 3,340,936 | 9/1967 | Godbersen | 172/678 |
| 3,387,861 | 6/1968 | Bauman | 280/412 |
| 3,515,223 | 6/1970 | Youngberg et al. | 172/310 |
| 3,544,130 | 12/1970 | Hayes | 172/311 |
| 3,544,131 | 12/1970 | Pennington | 172/311 |

FOREIGN PATENTS OR APPLICATIONS
14,243   4/1908   United Kingdom............... 280/458

*Primary Examiner*—E. H. Eickholt

[57] ABSTRACT

An agricultural implement frame comprising a pair of subframes convertible between a wide field-working position, wherein the subframes are arranged in side-by-side relation, and a narrow transport position, wherein the subframes are arranged in fore-and-aft relation with the rear or trailing subframe turned 180° relative to its field-working position. A pair of pivotally mounted, crossed linked members interconnect the rear portions of the subframes and form a positive steering connection therebetween when the subframes are in their transport position. The links are mounted on the subframes to permit full flexibility of the implement frame in the field-working position, yet maintain a certain degree of horizontal rigidity between the subframes in the transport position.

12 Claims, 9 Drawing Figures

PATENTED JUL 29 1975
3,896,882
SHEET 1
FIG. 2
FIG. 1
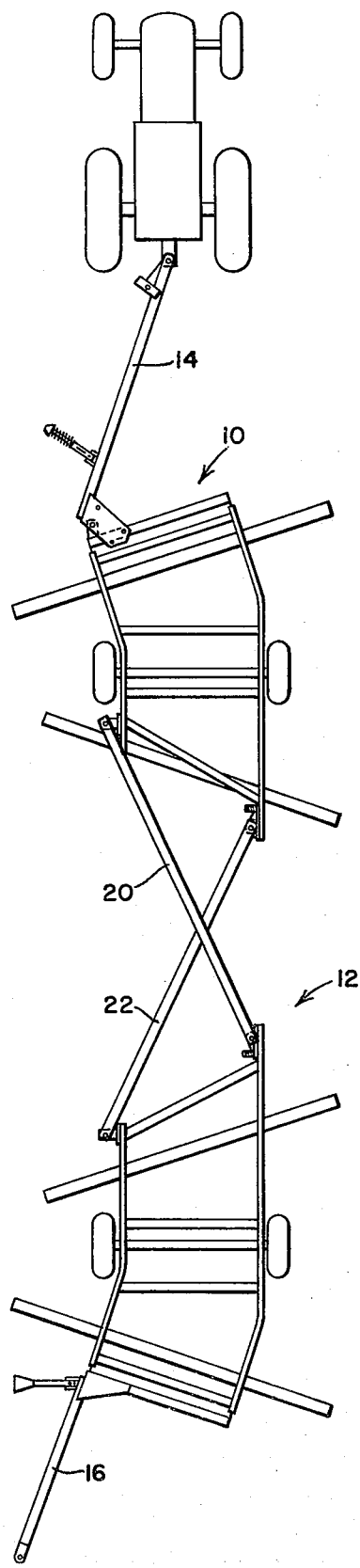
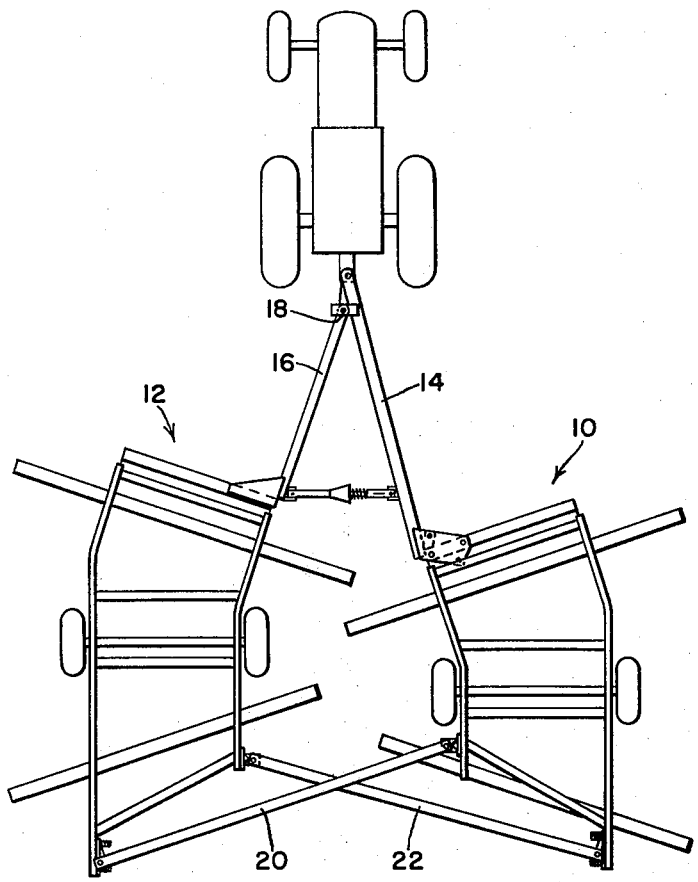
INVENTOR.
W. R. FRANK
BY
John O. Hayes
ATTORNEY

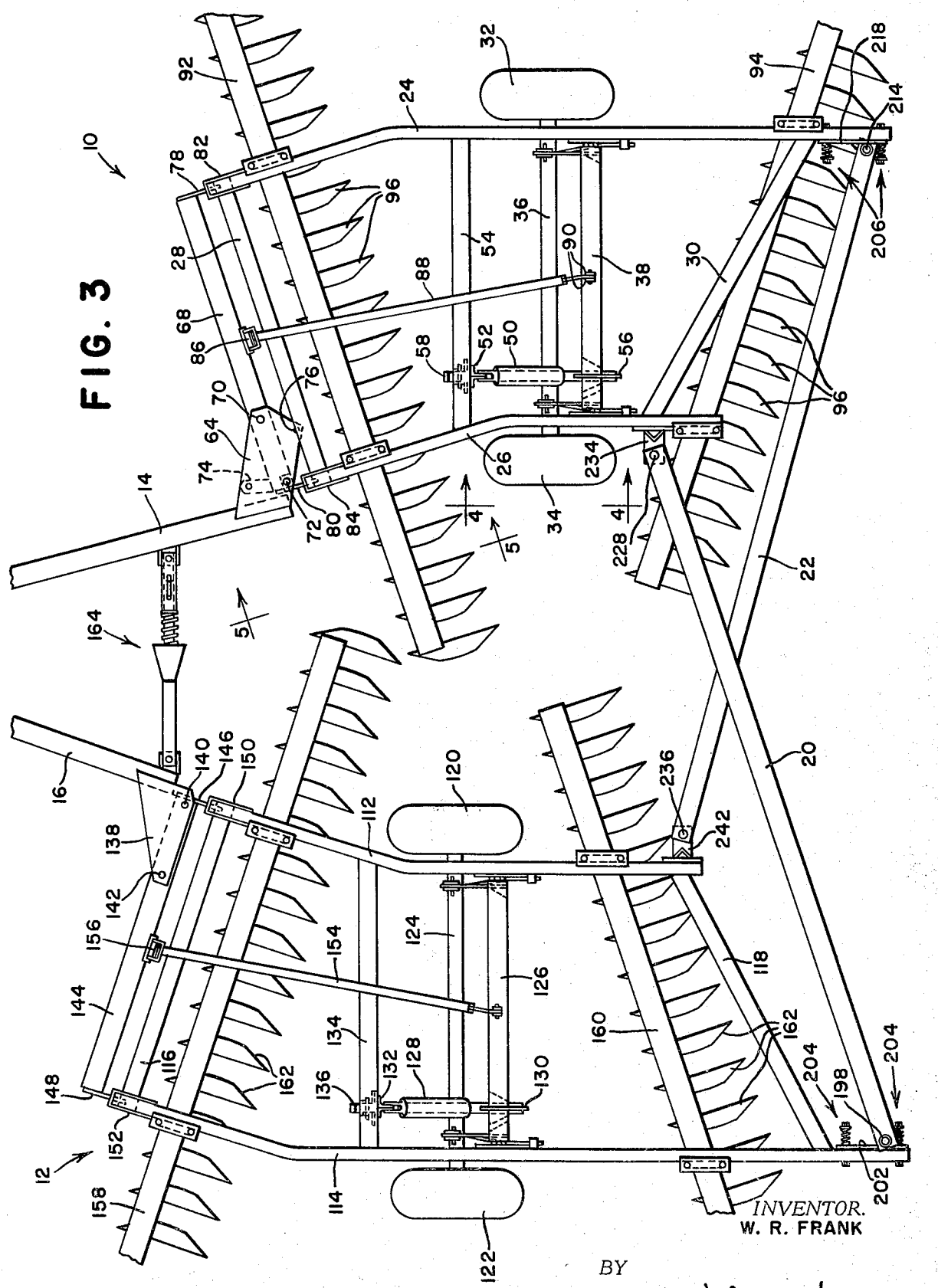

INVENTOR.
W. R. FRANK

BY
John O. Hayes
ATTORNEY

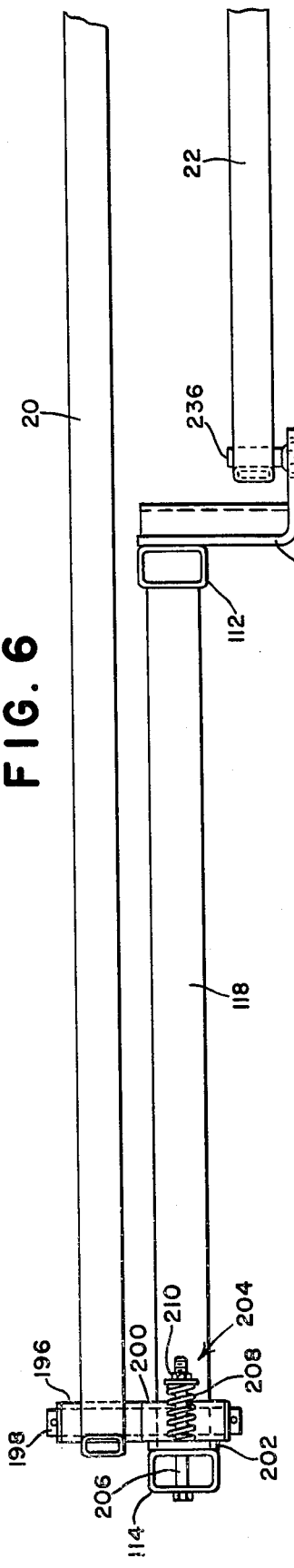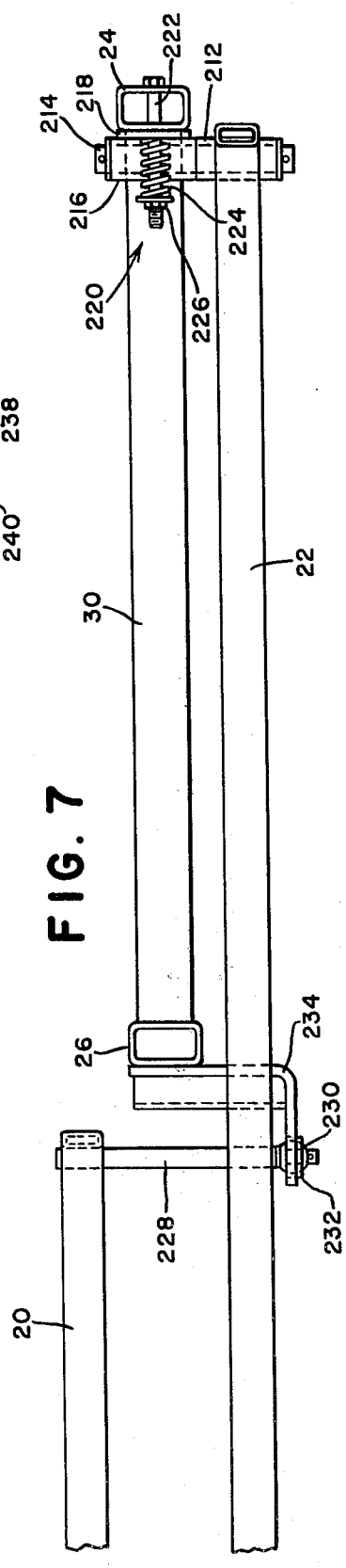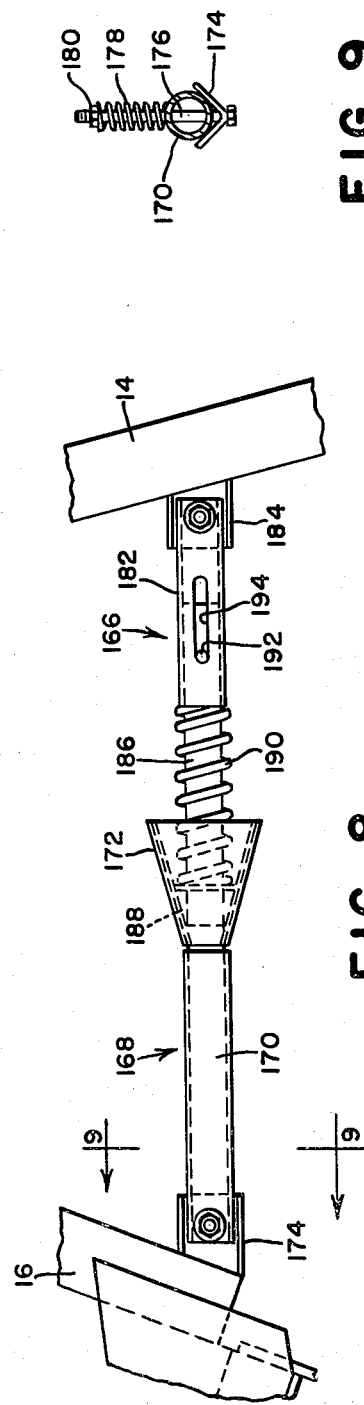

IMPLEMENT FRAME

BACKGROUND OF THE INVENTION

The present invention relates generally to agricultural implements and more particularly to an implement frame convertible between a wide field-working position and a narrow transport position.

There is a substantial trend in the farm equipment field toward wider and heavier ground-working implements capable of more effectively utilizing the abilities of larger, higher powered tractors. A limitation is encountered in the design of such implements, however, since although their maximum working width is limited only by the ability of the tractor to pull them through the ground, their maximum transport width is dictated by the width of existing roadways and gateways, as well as by legal and safety considerations. In view of this limitation, it is necessary to include in the design of such implements means whereby the implement can be converted from a wide position for field-working purposes to a substantially narrower width for transport purposes. A number of attempts have heretofore been made to provide such an implement, notable among which are the devices disclosed in U.S. Pat. No. 3,544,130 and 3,544,131, both issued Dec. 1 1970 and assigned to the assignee of the present invention.

SUMMARY OF THE INVENTION

The implement frame of the present invention is in the nature of an improvement in the devices disclosed in the above noted patents and comprises, in general, a pair of subframes which are adapted to travel in side-by-side relation for normal operating or field-working purposes, and in fore-and-aft relation for transport purposes. The subframes are interconnected by a pair of pivotally mounted crossed links which, when an additional connection is released, permit one of the subframes to swing 180° from its field-working position to a trailing position behind the other subframe, the crossed links forming a positive steering connection between the two subframes when in the latter position. The ends of the links are resiliently mounted on the subframes to permit full flexibility of the implement frame in the field-working position, yet maintain a certain degree of horizontal rigidity between the subframes when in the transport position. The implement includes a hitch member mounted on one of the subframes, the forward end of the hitch being shiftable between the respective longitudinal centerlines of the implement in its field-working and transport positions.

BRIEF DESCRIPTION OF THE DRAWINGS

The preferred embodiment of the invention will be described in conjunction with the accompanying drawings in which:

FIG. 1 is a plan view of the implement frame in its field-working position;

FIG. 2 is a plan view of the implement frame in its transport position;

FIG. 3 is an enlarged fragmentary plan view of the implement frame in its operating or field-working position;

FIG. 6 is an enlarged fragmentary rear elevation view illustrating the manner in which the connecting links are mounted on the left subframe;

FIG. 7 is an enlarged fragmentary rear elevation view illustrating the manner in which the connecting links are mounted on the right subframe;

FIG. 8 is an enlarged fragmentary plan view of the resilient strut interconnecting the subframes; and FIG. 9 is a sectional view taken along the line 9—9 of FIG. 8.

DESCRIPTION OF THE PREFERRED EMBODIMENT

Figure 4:
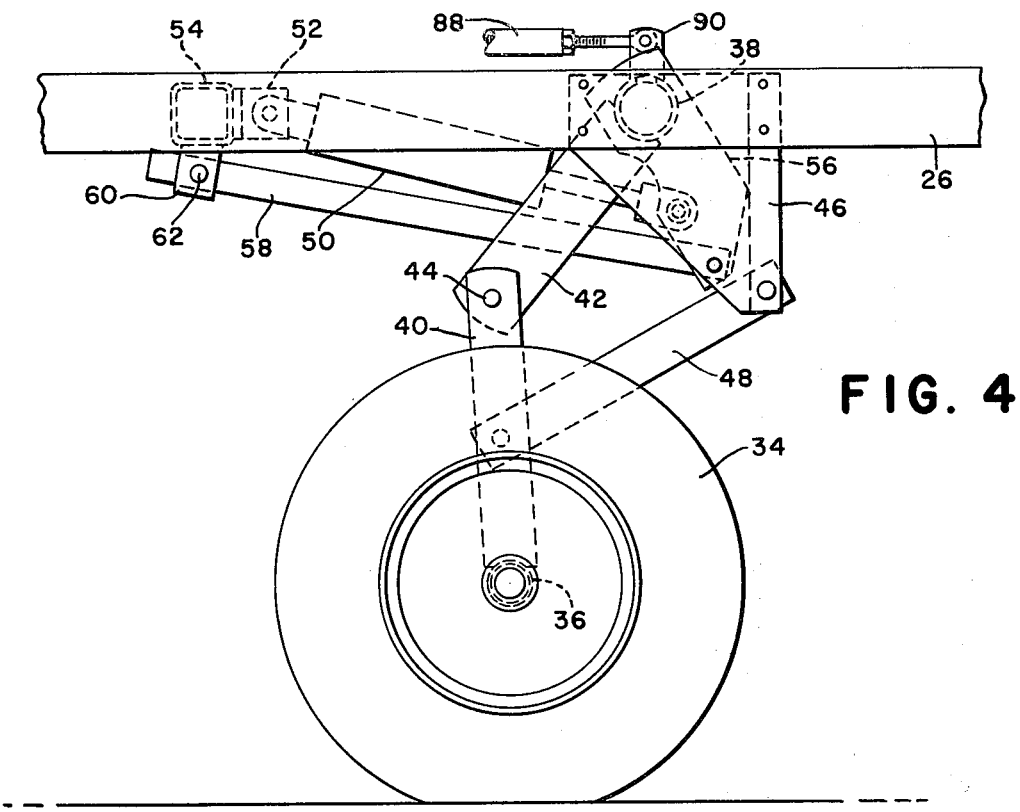
FIG. 4 is an enlarged side elevation view taken along the line 4—4 of FIG. 3.

The implement frame of the present invention comprises, generally, a pair of independently supported right and left subframes 10 and 12, respectively, which, as illustrated somewhat schematically in FIGS. 1 and 2, are convertible between a wide, side-by-side operating or field-working position and a narrow, fore-and-aft transport position. A pair of elongated draft or hitch members 14 and 16 converge forwardly from the front portions of the respective subframes 10 and 12 and are pinned at 18 to maintain the implement in its operating position. The hitch member 14 is adapted at its forward end for attachment to the drawbar of a tractor and is swingably mounted on the subframe 10 to move between operating and transport positions, the attaching point on the forward end of the member being substantially on the longitudinal centerline of the implement frame in each position. A pair of rigid crossed links 20 and 22 interconnect the rear portions of the subframes 10 and 12 to form a positive steering connection between the subframes when in their transport position. The procedure for converting the frame from its operating to its transparent position consists, generally, of releasing the pin connection 18 between the forward portions of the subframes, releasing the hitch member 14 from its operating position, driving the tractor forwardly, thereby causing the left subframe to swing around behind the right subframe while concurrently rotating 180 degrees from its operating position, and finally, locking the hitch 14 in its transport position.

Referring now to FIG. 3, which illustrates the frame in greater detail, the right subframe 10 includes a pair of right and left side members 24 and 26, respectively, interconnected at their fore-and-aft ends by cross members 28 and 30. The subframe is supported by a pair of transversely spaced ground wheels 32 and 34 rotatably carried on the opposite end of a transverse axle member 36, the axle 36, in turn, being connected to the opposite ends of a transverse rockshaft 38 for vertical adjustment in response to rotation of the latter. As shown in detail in FIG. 4, the apparatus for vertically adjusting the left end of the axle 36 relative to the subframe 10, and thus the subframe 10 relative to the ground, comprises a first upstanding arm 40 fixed to the axle 36, a second arm 42 extending radially from the rockshaft 38 and pivotally connected at 44 to the upper end of the arm 40, a triangular bracket 46 fixed to and extending beneath the side frame member 26, and a link 48 interconnecting an intermediate point on the arm 40 with the lower end of the bracket 46. The structure supporting the right end of the axle 36 is substantially identical to that shown in FIG. 4.

The rockshaft 38 is rotated, to raise and lower the subframe 10, by means of an extensible and retractable hydraulic ram 50 acting between a bracket 52 fixed to the rear side of a transverse brace 54, and an arm 56 on the rockshaft 38. A transport lock apparatus is provided in the form of a bar 58 pivotally connected to the lower end of the arm 56 and extending forwardly through a U-shaped support 60 on the underneath side of the brace 54. The bar is slidable through the support as the rockshaft is rotated by the cylinder 50, and may be fixed therein to lock the subframe at its transport height by means of a pin 62.

Figure 5:
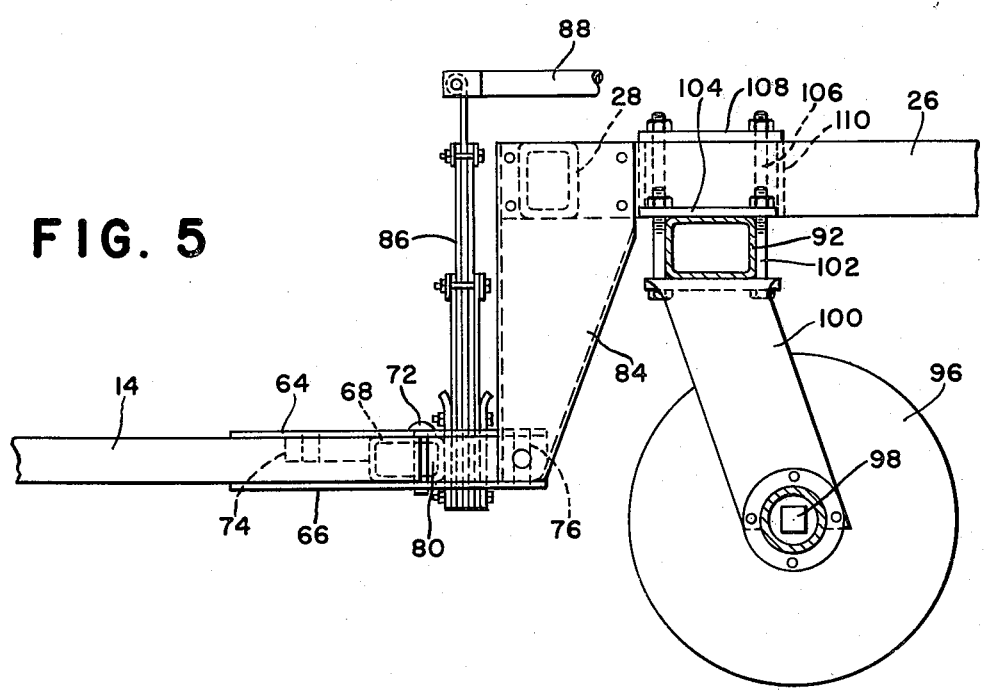
FIG. 5 is an enlarged side elevation view taken along the line 5—5 of FIG. 3.

Referring now to FIG. 5, a pair of plates 64 and 66 are fixed to the upper and lower sides, respectively, of the rearward end portion of the hitch member 14 and extend outwardly therefrom. A diagonally extending horizontal member 68 is received between the plates and is pivotally connected thereto by means of a pin connector 70. The hitch 14 is thus swingable between working and transport positions, shown in FIGS. 1 and 2, about the pivotal connection 70, the plates 64 and 66 acting as guides to maintain the hitch 14 and member 68 substantially horizontally rigid. A pair of vertically aligned apertures in the plates 64 and 66 receive a pin 72 which is selectively positionable in either the left end of the member 68 or the forward end of a support 74 fixed to the front side of the member 68, to lock the hitch in its working and transport positions, respectively. A vertical spacer member 76 connects the rear portions of the plates 64 and 66 and engages the rear side of the member 68 to act as a stop for the hitch in the transport position. A pair of right and left plate members 78 and 80 are fixed to the respective ends of the member 68 and are, in turn, pivotally mounted on the lower ends of a pair of triangular supports 82 and 84 extending vertically downwardly from the forward ends of the side frame members 24 and 26, respectively. The horizontally rigid unit formed by the hitch 14 and member 68 is thus swingable vertically relative to the remainder of the subframe 10. Such movement is resisted, however, by structure interconnecting the member 68 with the rockshaft 38, that structure comprising a vertically extending leaf spring assembly 86 mounted on the center upper of the member 68, and an adjustable link 88 interconnecting the upper end of the spring 86 with a pair of arms 90 on the top side of the rockshaft 38. As the rockshaft is rotated to raise and lower the subframe, the link 88 and spring 86 act to concurrently adjust the height of the forward end of the hitch 14 relative to the frame to maintain the implement substantially level. The spring 86 also permits the hitch to swing vertically relative to the subframe when operating in uneven ground.

Mounted on the front and rear portions of the subframe 10 are elongated, diagonally extending toolbars 92 and 94, respectively, the toolbars supporting elongated gangs of concave soil-working discs 96 in ground-engaging relation therebeneath. With reference again to FIG. 5, the discs 96 are mounted in a conventional manner on a gang bolt 98, and the latter, in turn, is rotatably supported on the lower end of a plurality of vertical standards 100. The standards 100 are mounted on the toolbars 92 and 94 in a conventional manner by means of bolts 102 and plates 104. The toolbars, in turn, are mounted on the side frame members 24 and 26 by means of elongated U-bolts 106 and plates 108, the U-bolts extending around the underneath side of the toolbar and upwardly through brackets 110 fixed to the side of the members 24 and 26.

The left subframe 12 is constructed in a manner similar to that of the right subframe 10 includes a pair of right and left side members 112 and 114, respectively, interconnected at their fore and aft ends by cross members 116 and 118. A pair of transversely spaced ground wheels 120 and 122 support the subframe 12 relative to the ground. The wheels 120 and 122 are rotatably carried on opposite ends of a transverse axle 124, the axle being supported on the subframe for vertical adjustment in response to rotation of a transverse rockshaft 126. The mechanism which supports the axle 124 is substantially identical to that shown in FIG. 4 and described with reference to the axle 36 on the right subframe 10. The rockshaft 126 is rotated by means of a hydraulic ram 120 operating between an arm 130 on the rockshaft 126 and a bracket 132 to a cross brace 134. A transport lock rod 136 is pivotally connected at its rearward end to the arm 130 and extends forwardly through a U-shaped support on the fixed to side of the brace 134. The rod can be fixed relative to the brace to lock the subframe 12 in its raised, transport position.

A pair of vertically spaced plates 138 (only the upper one being shown) are fixed to the upper and lower sides of the hitch member 16 and are in turn pinned, at 140 and 142, to a horizontal, diagonally extending member 144. A pair of rearwardly extending plate members 146 and 148, fixed to the opposite ends of the member 144, are pivotally mounted on the lower ends of support members 150 and 152, thereby permitting the hitch 16 to swing vertically relative to the subframe 12. An adjustable link 154 and leaf spring assembly 156 interconnect the rockshaft 126 with the member 144 to maintain a certain degree of horizontal rigidity between the shaft 126 and member 144, while at the same time permitting the hitch to swing vertically when operating in uneven ground.

Mounted on the front and rear portions of the subframe 12 are elongated, diagonally extending toolbars 158 and 160, respectively, which in turn support elongated gangs of concave soil-working discs 162 in ground-engaging relation therebeneath. As shown in FIG. 3, the toolbars 158 and 160 on the left subframe 12 are spaced forwardly of the respective toolbars 92 and 94 on the right subframe 10, and the innermost discs on the front toolbars 92 and 158 are overlapped transversely. This arrangement of the discs on the implement, which produces a smooth, ridge-free soil pattern at the rear of the implement, is described in detail in copending U.S. application Ser. No. 113456, filed FEB. 8 1971 and assigned to the assignee of the present invention.

Due to this fore-and-aft offset relationship of the forward pair of disc gangs, it is possible to construct the harrow so that the subframes can yield inwardly relative to each other upon striking a rock, stump, or other obstruction. According to the present invention, this capability is achieved simply by removing the pin 140 connecting the hitch member 16 with the left subframe 12, and removing the pin 72 connecting the hitch member 14 with the right subframe 10. With these pins removed, the hitch members 14 and 16 are free to pivot about the remaining pins 70 and 142, respectively, thereby permitting the forward portions of the subframes 10 and 12 to move inwardly toward each other. The subframe are normally maintained in their normal operating position by means of a resilient strut 164 acting between the rear portions of the hitch members 14 and 16. The strut 164, as illustrated in detail in FIG. 9, is composed of two sections 166 and 168 mounted on the members 14 and 16, respectively, and adapted to engage each other when the implement is in the field-working position. The section 168 on the left subframe 12 comprises a rigid pipe section 170 with a funnel-shaped guide 172 formed integrally with one end thereof, the end of the section 170 opposite the guide 172 being resiliently pivotally mounted on a V-shaped bracket 174 on the hitch member 16. As shown in detail in FIG. 8, a bolt 176 extends upwardly through aligned apertures in the bracket 174 and walls of the section 170, and receives a coil spring 178 and nut 180 on its upper end. The spring 178 acts to bias the section 170 into the bracket 174 and normally maintain it is alignment therewith. The section 166 of the strut on the right subframe 10 comprises a first pipe section 182 resiliently pivotally mounted on a V-shaped bracket 184 in a manner similar to that in which the section 170 is mounted in the bracket 174. A second pipe section 186, having a frustoconical outer end portion 188 shaped complementary with the interior of the funnel-shaped guide 172 on the left section 168, is slidably received within the first pipe section 182. A coil spring 190 acts between the frustoconical end portion 188 and the first pipe section 182 to bias the end portion 188 outwardly, and a stop member 192 fixed to the section 186 and projecting outwardly through a slot 194 in the section 182 is engageable with the ends of the slot limit the inner and outer extent of travel of the section 186 relative to the section 182. The preload on the spring 190 is sufficient to maintain the forward portions of the subframes 10 and 12 generally in the position illustrated in FIG. 3 during normal operation of the implement, through should one of the front disc gangs strike a rock or stump, the abnormal load thus exerted on the strut would compress the spring 190 and permit the respective subframe to move transversely inwardly, thereby cushioning the shock of the obstruction.

As shown in FIGS. 1 and 3, the links 20 and 22, when the implement frame is in the working position, interconnect the rear corners of the subframes 10 and 12 and cross approximately on the centerline of the implement. The manner in which the ends of the links are connected to the subframes is shown in detail in FIGS. 6 and 7. Referring first to FIG. 6, the left end of the link 20 is provided with a hollow, cylindrical member 196 extending vertically through and fixed to the upper and lower walls of the link 20. The upper end of a cylindrical pin 198 is pivotally received in the member 196, and the lower end is similarly received in a hollow, cylindrical member 200. The member 200 is fixed to the side of a vertically disposed, fore-and-aft elongated rectangular plate 202 which, in turn, is normally held against the inner side of the frame member 114 by a pair of longitudinally spaced and spring assemblies 204. Each assembly 204 comprises a bolt 206 extending through aligned apertures in the inner and outer walls of the member 114 and the plate 202, and a compression spring 208 retained on the inner end of the bolt by means of a nut 210. Under level ground conditions, i.e., when the subframes and links are substantially parallel as illustrated in FIGS. 6 and 7, the force of the springs 208 is sufficient to hold the plate 202 securely against the vertical inner wall of the frame 114, thereby maintaining the axis of the pin 198, and thus the axis of the pivotal connection between the link 20 and left subframe 12, in a substantially vertical position. In uneven ground, i.e., when the links and subframes move out of their horizontally parallel condition, the springs 208 permit the plate 202 to swing away from the member 114 to an inclined position. Although the link 20 is thus pivotal relative to subframe 12 about a horizontal axis, the springs 208 act to yieldably maintain the link 20 in a preselected vertical position relative to the subframe 12. In the illustrated embodiment, the pre-selected position of the link 20 is that shown in FIGS. 6 and 7, wherein it is disposed substantially horizontal and parallel with the subframe 12.

As shown in FIG. 7, the right end of the link 22 is connected to the right rear corner of the right subframe 10 in a manner substantially identical to that just described with respect to link 20 and left subframe 12. A hollow, cylindrical member 212 is fixed to the end of the link 22 and pivotally receives the lower end of a cylindrical pin 214. The upper end of the pin 214 is pivotally received by a hollow cylindrical member 216 fixed to the side of a rectangular plate 218, the plate 218, in turn, being normally held against the vertical inner wall of the frame member 24 by means of bolt and spring assemblies 220. The assemblies 220 are identical to the assemblies 204 and comprise a bolt 222 extending through aligned apertures in the walls of the member 24 and through the plate 218, and a compression spring 224 retained on the inner end of the bolt by means of a nut 226. The function served by the connection just described, like that of the connection between the link 20 and subframe 12, is to permit the link 22 to pivot about a horizontal axis relative to the subframe 10, yet at the same time to yieldably maintain the link in a preselected vertical position.

The connection between the right end of the link 20 and the left rear corner of the right subframe 10, shown in FIG. 7, comprises a vertical post 228 extending downwardly from the end of the link 20 and having a ball 230 on its lower end, the ball 230 being received in a socket 232 on a bracket 234 fixed to the frame member 226. Similarly, the connection between the left end of the link 22 and the right rear corner of the left subframe 12, shown in FIG. 6, comprises a vertical post 236 having a ball 238 on its lower end, the ball 238 being received in a socket 240 on a bracket 242 fixed to the frame member 112. It will be apparent that these ball-and-socket connections permit relative pivotal movement of the links 20 and 22 and subframes 10 and 12, respectively, about both vertical and horizontal axes.

When the subframes 10 and 12 are in the side-by-side working position of FIG. 1, the ball-and-socket and spring-biased connections between the links and subframes permit the subframes to move out of horizontal alignment to better conform to the surface of the ground. When converted to their fore-and-aft transport position of FIG. 2, the spring-biased connections between the links and subframes maintain a sufficient degree of horizontal rigidity between the subframes 10 and 12 to prevent the trailing subframe 12 from tipping about the horizontal axis passing through the wheels 120 and 122 and dragging on the ground. At the same time, however, the springs 208 and 224 give the unit a sufficient amount of flexibility to conform to fore-and-aft as well as transverse variations in the ground level.

The spring-biased connections between the links and subframes serve yet another function. As will be apparent from a study of FIGS. 6 and 7, should the subframes 10 and 12 pivot relative to each other about horizontal, longitudinal axes, one of the links will be placed in compression while the other will be placed in tension. Unless provision is included in the implement to absorb at least one of these forces, either the subframes will be prevented from moving in this manner, or, alternatively, the links or subframes will fail structurally. According to the preferred embodiment of the invention, provision is made in the form of the spring-biased connections to absorb tension forces in each of the links. In addition to permitting the normally vertical pivotal axes between the links and subframes to pivot away from their vertical positions, the mountings also permit the axes to move transversely inwardly relative to the subframes, thereby in effect permitting the links to "stretch" and absorb the tension forces exerted thereon. This feature of the spring-biased mountings not only permits the subframes to pivot relative to each other about longitudinal axes, it also permits the rear portions of the subframes to move transversely outwardly relative to each other. Thus, should the rear disc gang on one of the subframes strike a rock, stump, or other obstruction, the spring-biased mountings between the links and subframes permit the rear portion of the subframe to move outwardly to cushion the shock.

I claim:

1. An implement frame comprising: a pair of subframes disposed in side-by-side relation for normal operating purposes, each of said subframes being supported relative to the ground by a pair of transversely spaced wheel means and rockable vertically about an axis passing through said pair of wheel means; a pair of crossed links interconnecting the rear portions of said subframes, said links being articulately connected to said subframes for relative horizontal and vertical pivotal movement; resilient means connecting at least one of said links to at least one of said subframes for yieldably maintaining said link in a preselected vertical position relative to said subframe; hitch means on the forward portion of at least one of said subframes for attaching said subframe to a towing vehicle; and means interconnecting the forward portions of said subframes, said means being releasable to permit one of said subframes, in response to a moving force acting on the other of said subframes, to swing around to a transport position behind the other subframe wherein it is turned 180 degrees relative to its operating position, said crossed links forming a steering connection between the subframes when disposed in their transport position.

2. The invention defined in claim 1 including resilient means connecting both of said links to said subframes for yieldably maintaining said links in pre-selected vertical positions relative to said subframes.

3. The invention defined in claim 1 wherein said hitch means includes attaching means on its forward end, and wherein said hitch means is pivotally mounted on the forward portion of at least one of said subframes for swinging movement between a working position, wherein the attaching means is disposed substantially on the longitudinal centerline of the subframes when in their side-by-side working position, and a transport position wherein the attaching means is disposed substantially on the longitudinal centerline of the subframes when their fore-and-aft transport position.

4. The invention defined in claim 1 wherein said crossed links are vertically spaced to permit said subframes to pivot relative to each other about generally longitudinal axes.

5. The invention defined in claim 1 wherein the left rear corner of the left subframe, when the subframes are disposed in their side-by-side operating positions, is disposed rearwardly of the right rear corner of the left subframe, and the right rear corner of the right subframe is disposed rearwardly of the left rear corner of the right subframe, and wherein one of said crossed links interconnects the left rear corner of the left subframe with the left rear corner of the right subframe, and the other of said links interconnects the right rear corner of the left subframe with the right rear corner of the right subframe.

6. The invention defined in claim 1 wherein each of said subframes includes an elongated gang of groundworking tools mounted on its forward portion, said gangs, when the subframes are disposed in their side-by-side operating position, terminating inwardly in adjacent inner end portions, said end portions being longitudinally spaced to permit the forward portions of said subframes to move inwardly relative to each other.

7. The invention defined in claim 6 including resilient means acting between the forward portions of said subframes to resist relative inward movement thereof.

8. An implement frame comprising: a pair of subframes disposed in side-by-side relation for normal operating purposes, each of said subframes being independently supported relative to the ground; link means interconnecting the rear portions of said subframes, said link means being mounted on said subframes for pivotal movement about generally vertical, parallel axes; means connecting the forward portions of said subframes, said connecting means permitting the subframes to move transversely inwardly relative to each other and being releasable to permit one of said subframes to swing around to a transport position behind the other subframe wherein it is turned 180° from its operating position, said link means forming a draft connection between the subframes when disposed in their transport position; and resilient means acting between the forward portions of said subframes to resist relative inward movement of the forward portions of said subframes.

9. The invention defined in claim 8 wherein each of said subframes includes an elongated gang of groundworking tools mounted on its forward portion, said gangs, when the subframes are disposed in their side-by-side operating position, terminating inwardly in adjacent inner end portions, said end portions being spaced longitudinally to permit the forward portions of said subframes to move inwardly relative to each other.

10. An implement frame comprising: a pair of subframes disposed in side-by-side relation for normal operating purposes, each of said subframes being supported relative to the ground by a pair of transversely spaced wheel means and rockable vertically about an axis passing through said pair of wheel means; a pair of crossed links interconnecting the rear portions of said subframes, said links being articulately connected to said subframes for relative horizontal and vertical pivotal movement; at least one pivot member; means connecting at least one of the links to said pivot member for movement about a single pivot axis; resilient means yieldably mounting said pivot member on the frame and normally maintaining said pivot axis in a substantially vertical position; hitch means on the forward portion of at least one of the subframes for attaching the subframe to a towing vehicle; and means interconnecting the forward portions of the subframes, said means being releasable to permit one of the subframes, in response to a moving force acting on the other subframe, to swing around to a transport position behind the other subframe wherein it is turned 180°relative to its operating position, the crossed links forming a steering connection between the subframes when disposed in their transport position.

11. The invention defined in claim 10 wherein said means yieldably mounting said pivot member on said subframe comprises a bolt supported on said subframe and extending through a vertically elongated slot in said pivot member, a coil spring received on the outer end of said bolt and engageable at one end with said pivot member, and a nut on said bolt engageable with the other end of said spring and operative to compress said spring against said pivot member and thereby bias said pivot member against the subframe.

12. An implement frame comprising: a pair of subframes disposed in side-by-side relation for normal operating purposes, each subframe being supported relative to the ground by a pair of transversely spaced wheel means and rockable vertically about an axis passing through said pair of wheel means; a pair of crossed links interconnecting the rear portions of the subframes, said links being articulately connected at each end to the subframes for relative horizontal and vertical pivotal movement; resilient means connecting at least one end of each link to one of the subframes for yieldably maintaining the link in a preselected vertical position relative to the subframe, said resilient means permitting the links to yieldably move outwardly relative to the subframes, and thereby permitting the rear portions of the subframes, when disposed in their normal position, to yieldably move outwardly relative to each other; hitch means on the forward portion of at least one of the subframes for attaching the subframe to a towing vehicle; and means interconnecting the forward portions of the subframes, said means being releasable to permit on of the subframes, in response to a moving force acting on the other subframe, to swing around to a transport position behind the other subframe wherein it is turned 180°relative to its operating position, the crossed links forming a steering connection between the subframes when disposed in their transport position.

* * * * *